(12) United States Patent
Liu et al.

(10) Patent No.: US 8,666,931 B2
(45) Date of Patent: Mar. 4, 2014

(54) REGULAR EXPRESSION MATCHING USING TCAMS FOR NETWORK INTRUSION DETECTION

(75) Inventors: Xiang-Yang A. Liu, Okemos, MI (US); Chad R. Meiners, Westford, MA (US); Eric Torng, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 163 days.

(21) Appl. No.: 13/183,964

(22) Filed: Jul. 15, 2011

(65) Prior Publication Data

US 2012/0072380 A1 Mar. 22, 2012

Related U.S. Application Data

(60) Provisional application No. 61/365,079, filed on Jul. 16, 2010.

(51) Int. Cl.
*G06F 15/00* (2006.01)
*G06F 15/18* (2006.01)

(52) U.S. Cl.
USPC .......................................................... 706/62

(58) Field of Classification Search
USPC .......................................................... 706/62
See application file for complete search history.

(56) References Cited

U.S. PATENT DOCUMENTS

| | | | | |
|---|---|---|---|---|
| 5,995,963 | A * | 11/1999 | Nanba et al. | 1/1 |
| 8,347,384 | B1 * | 1/2013 | Preston | 726/23 |
| 2006/0085389 | A1 * | 4/2006 | Flanagan et al. | 707/2 |
| 2006/0253816 | A1 * | 11/2006 | Gould et al. | 716/5 |
| 2010/0131935 | A1 * | 5/2010 | Wang | 717/143 |

OTHER PUBLICATIONS

B. Agrawal and T. Sherwood. Ternary CAM power and delay model: Extensions and uses. IEEE Trans. VLSI Syst., 16(5):554-564, 2008.*
Sailesh Kumar , Jonathan Turner , John Williams, Advanced algorithms for fast and scalable deep packet inspection, Proceedings of the 2006 ACM/IEEE symposium on Architecture for networking and communications systems, Dec. 3-5, 2006, San Jose, California, USA.*
Sailesh Kumar , Sarang Dharmapurikar , Fang Yu , Patrick Crowley , Jonathan Turner, Algorithms to accelerate multiple regular expressions matching for deep packet inspection, Proceedings of the 2006 conference on Applications, technologies, architectures, and protocols for computer communications, Sep. 11-15, 2006, Pisa, Italy.*
C.R. Meiners, et al., (2007) TCAM Razor: A systematic approach towards minimizing packet classifiers in TCAMs. In: Proc. 15th IEEE conf. on Network Protocols (ICNP), pp. 266-275.*
N. Hua et al "Variable-Stride Multi-Pattern Matching for Scalable Deep Packet Inspection", IEEE INFOCOM Proceedings 2009.
N. Yamagaki et al "High-Speed Regular Expression Matching Engine Using Multi-Character NFA", IEEE 2008.

* cited by examiner

*Primary Examiner* — Kakali Chaki
*Assistant Examiner* — Vincent Gonzales
(74) *Attorney, Agent, or Firm* — Harness, Dickey & Pierce, P.L.C.

(57) ABSTRACT

A method is provided for implementing regular expression matching using ternary content-addressable memory devices. The method includes: receiving a set of regular expressions (REs) that specify data elements to be extracted from data packets; constructing a deterministic finite automaton (DFA) from the set of regular expressions; building a state transition table for each node of the deterministic finite automaton; combining the state transition tables into a single lookup table; and instantiating the lookup table in a ternary content-addressable memory device. Additional techniques are provided to reduce the TCAM space and improve RE matching speed.

15 Claims, 8 Drawing Sheets

REGULAR EXPRESSION MATCHING USING TCAMS FOR NETWORK INTRUSION DETECTION

CROSS-REFERENCE TO RELATED APPLICATIONS

This application claims the benefit of U.S. Provisional Application No. 61/365,079, filed on Jul. 16, 2010. The entire disclosure of the above application is incorporated herein by reference.

FIELD

The present disclosure relates to regular expression matching for network intrusion detection and prevention systems.

BACKGROUND

Deep packet inspection is a key part of many networking devices on the Internet such as Network Intrusion Detection (or Prevention) Systems (NIDS/NIPS), firewalls, and layer 7 switches. In the past, deep packet inspection typically used string matching as a core operator, namely examining whether a packet's payload matches any of a set of predefined strings. Today, deep packet inspection typically uses regular expression (RE) matching as a core operator, namely examining whether a packet's payload matches any of a set of predefined regular expressions, because REs are fundamentally more expressive, efficient, and flexible in specifying attack signatures. Most open source and commercial deep packet inspection engines such as Snort, Bro, TippingPoint X505, and many Cisco networking appliances use RE matching. Likewise, some operating systems such as Cisco IOS and Linux have built RE matching into their layer 7 filtering functions. As both traffic rates and signature set sizes are rapidly growing over time, fast and scalable RE matching is now a core network security issue.

RE matching algorithms are typically based on the Deterministic Finite Automata (DFA) representation of regular expressions. A DFA is a 5-tuple $(Q, \Sigma, \delta, q_0, A)$ where $Q$ is a set of states, $\Sigma$ is an alphabet, $\delta: \Sigma \times Q \rightarrow Q$ is the transition function, $q_0$ is the state, and $A \subseteq Q$ is a set of accepting states. Any set of regular expressions can be converted into an equivalent DFA with the minimum number of states. The fundamental issue with DFA-based algorithms is the large amount of memory required to store transition table $\delta$. We have to store $\delta(q, a)=p$ for each state $q$ and character $a$.

Prior RE matching algorithms are either software-based or FPGA-based. Software based solutions have to be implemented in customized ASIC chips to achieve high-speed, the limitations of which include high deployment cost and being hard-wired to a specific solution and thus limited ability to adapt to new RE matching solutions. Although FPGA-based solutions can be modified, resynthesizing and updating FPGA circuitry in a deployed system to handle regular expression updates is slow and difficult; this makes FPGA-based solutions difficult to be deployed in many networking devices (such as NIDS/NIPS and firewalls) where the regular expressions need to be updated frequently.

This section provides background information related to the present disclosure which is not necessarily prior art.

SUMMARY

A method is provided for implementing regular expression matching using ternary content-addressable memory devices. The method includes: receiving a set of regular expressions that specify data elements to be extracted from data packets; constructing a deterministic finite automaton (DFA) from the set of regular expressions; building a state transition table for each node of the deterministic finite automaton; combining the state transition tables into a single lookup table; and instantiating the lookup table in a ternary content-addressable memory device.

Two techniques are provided for minimizing the TCAM space needed for storing a DFA. Shadow encoding exploits inter-state optimization opportunities and minimizes TCAM tables along the source state dimension; whereas, table consolidation merges multiple transition tables having similar structures but different decisions into one transition table.

In another aspect, matching speed is improved by storing transitions with a variety of strides in the TCAM, thereby increasing the average number of characters consumed per transition.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 1:
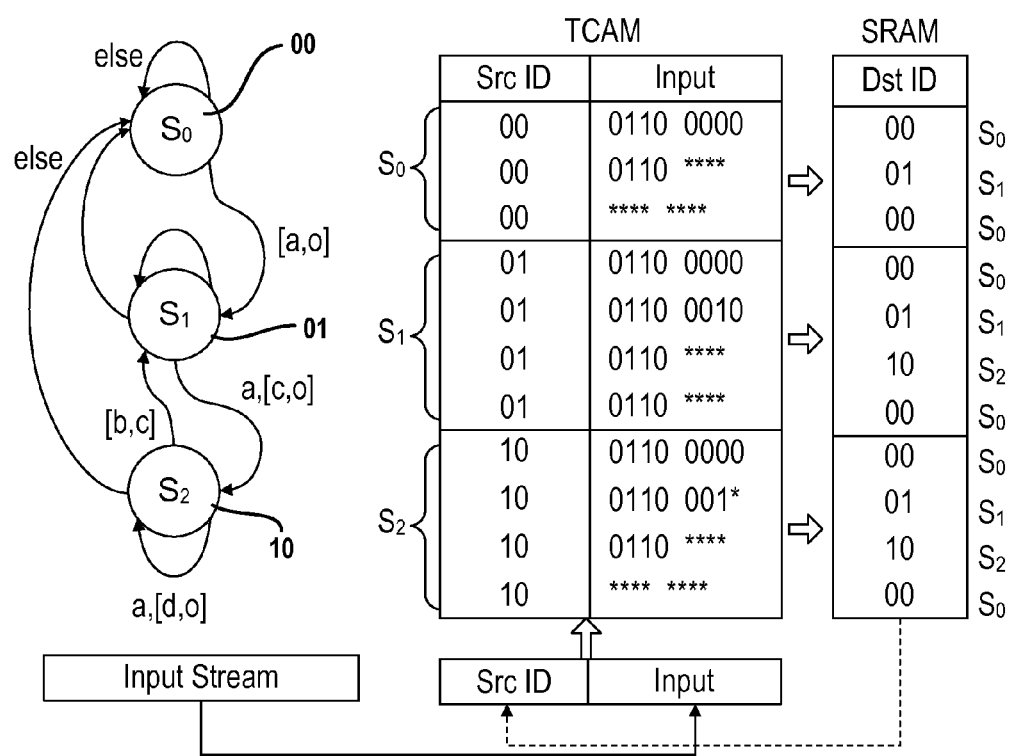
FIG. 1 is a diagram of an exemplary deterministic finite automata and its TCAM lookup table.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

A hardware-based regular expression matching approach that uses ternary content addressable memory (TCAM) is set forth below. By way of background, TCAM entries and lookup keys are encoded in ternary as 0's, 1's and *'s where *'s stand for either 0 or 1. A lookup key matches a TCAM entry if and only if the corresponding 0's and 1's match; for example, key 0001101111 matches entry 0001108888. TCAM circuits compare a lookup key with all of its occupied entries in parallel and return the index (or sometimes the content) of the first address for the content that the key matches; this address is then used to retrieve the corresponding decision in SRAM.

FIG. 1 illustrates an exemplary DFA, its TCAM lookup table and its SRAM decision table. Given an RE set, an equivalent minimum state DFA is first constructed. Second, a two column TCAM lookup table is built, where each column encodes one of the two inputs to δ: the source state ID and the input character. Third, for each TCAM entry, the destination state ID is stored in the same entry of the associated SRAM. How this DFA processes is illustrated with the input stream "01101111, 01100011". A TCAM lookup key is formed by appending the current input character to the current source state ID. In this example, append the first input character "01101111" to "00", the ID of the initial state $s_0$, to form "0001101111". The first matching entry is the second TCAM entry, so "01", the destination state ID stored in the second SRAM entry is returned. The next TCAM lookup key "0101100011" is formed by appending the second input character "011000011" to this returned state ID "01", and the process repeats.

Figure 2:
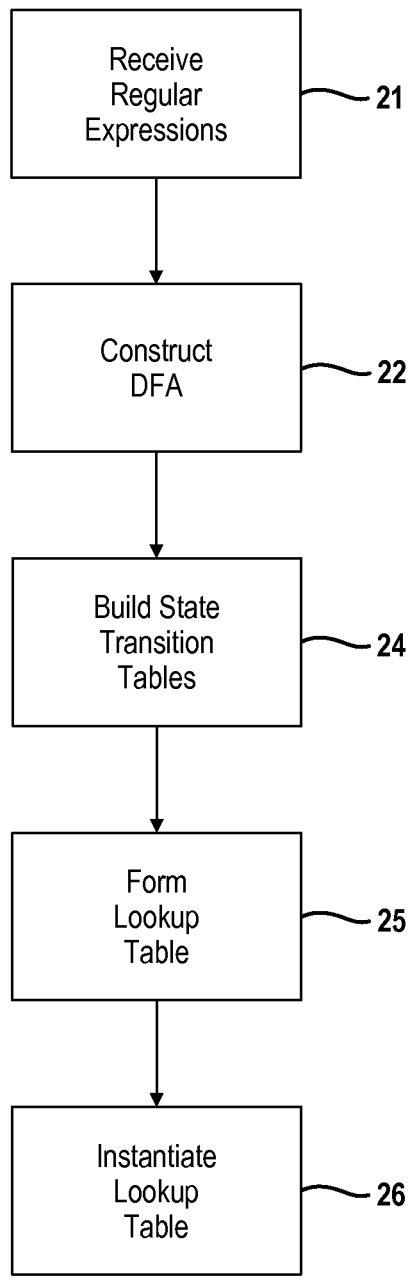
FIG. 2 is a flowchart depicting a method for implementing regular expression matching using ternary content-addressable memory devices.

FIG. 2 depicts an overview of a method for implementing regular expression matching using ternary content-addressable memory devices. As a starting point, a set of regular expressions is presented as indicated at 21. The regular expression specify data elements to be extracted from data packets.

A deterministic finite automaton (DFA) is constructed at 22 from the set of regular expressions. A DFA is commonly defined as a 5-tuple (Q, Σ, δ, $q_0$, A), where Q is the set of states,
Σ is the alphabet,
δ:Σ×Q→Q is the transition function,
$q_0$∈Q is the start state, and
A⊂Q is the set of accepting states.

Normally, one does not care which accepting state is reached; reaching one accepting state is equivalent to reaching any other accepting state. This leads to significant compression in the resulting minimum state DFA.

However, many pattern matching applications where a set of REs, R, is given, one must keep track of which REs have been satisfied. For example, each RE may correspond to a different security threat. Each threat may require its own unique processing routine to determine if the packet flow actually corresponds to the given threat. Thus, the last term, A, in the 5-tuple definition of a DFA is redefined as A:Q→$2^R$. For each state q in the DFA, A gives the set of REs from R that are satisfied when q is reached. Given this requirement, some compression is lost in the resulting minimum state DFA.

Given a set of REs R, the corresponding DFA can be built using the standard method: first build an NFA for the RE that corresponds to an OR of all the REs r∈R, then convert the NFA to a DFA, and finally minimize the DFA treating accepting states as equivalent if and only if they correspond to the same set of regular expressions. This method can be very slow, mainly due to the NFA to DFA conversion, which often results in an exponential growth in the number of states. A more efficient construction method is presented that works for the modified definition of a DFA.

The more efficient construction algorithm works as follows. First for each regular expression r∈R, convert r into an equivalent minimum state DFA D. Let $R_1$ and $R_2$ denote any two disjoint subsets of R, and suppose $D_1$ and $D_2$ are their corresponding minimum state DFAs. Use the standard union cross product construction to construct a minimum state DFA $R_3$ that corresponds to REs $R_1 \cup R_2$. Specifically, suppose we are given the two DFAs $D_1=(Q_1, \Sigma, \delta_1, q_{01}, A_1)$ and $D_2=(Q_2, \Sigma, \delta_2, A_2)$. The union cross product DFA is given by $$D_3=(Q_3, \Sigma, \delta_3, q_{03}, A_3)$$

where $$Q_3=Q_1 \times Q_2$$

$$\delta_3([q_i,q_j])=[\delta_1(q_i), \delta_2(q_j)]$$

$$q_{03}=[q_{0_1}, q_{0_2}]$$

$$A_3([q_i,q_j])=A_1(q_i) \cup A_2(q_j)$$

An argument that this construction is correct follows. This is a standard construction so the fact that $D_3$ is an equivalent DFA for $R_3=R_1 \cup R_2$ is straightforward and covered in standard automata theory textbooks (e.g. J. E. Hoperoft "The Theory of Machines and computations". $D_3$ is indeed a minimum state DFA for $R_3$.

Many states in $Q_3$ might not be reachable from the start state $q_{03}$. Thus, while constructing $D_3$, only create states that are reachable from $q_{03}$. In the case of a traditional DFA with only one type of accepting state, the resulting $D_3$ is not necessarily minimum. However, for the modified DFA, $D_3$ is also minimum if $R_1 \cap R_2 = \emptyset$.

Theorem 3.1: Given two RE sets, $R_1$ and $R_2$, and equivalent minimized DFAs, $D_1$ and $D_2$, the union cross product DFA $D_3$ with only reachable states constructed is the minimized DFA equivalent to $R_3=R_1 \cup R_2$ if $R_1 \cap R_2=\emptyset$.

Proof: First since only reachable states are constructed, $D_3$ cannot be trivially reduced. Now assume $D_3$ is not minimum. That would mean there are two states in $D_3$, say $[p_1, p_2]$ and $[q_1, q_2]$, that are indistinguishable. This implies $$\forall x \in \Sigma^*, A_3(\delta_3([p_1,p_2],x))=A_3(\delta_3([q_1,q_2],x))$$

$$\forall x \in \Sigma^*, A_3([\delta_1(p_1,x), \delta_2(p_2,x)])=A_3([\delta_1(q_1,x), \delta_2(q_2,x)])$$

$$\forall x \in \Sigma^*, A_1(\delta_1(p_1,x)) \cup A_2(\delta_2(p_2,x))=A_1(\delta_1(q_1,x)) \cup A_2(\delta_2(q_2,x))$$

Now since $R_1 \cap R_2=\emptyset$, this gives us $$\forall x \in \Sigma^*, A_1(\delta_1(p_1,x))=A_1(\delta_1(q_1,x)) \text{ and}$$

$$\forall x \in \Sigma^*, A_2(\delta_1(p_2,x))=A_2(\delta_1(q_2,x))$$

This implies that $p_1$ and $q_1$ are indistinguishable in $D_1$ and $p_2$ and $q_2$ are indistinguishable in $D_2$, implying that both $D_1$ and $D_2$ are not minimum, which is a contradiction. For practical RE sets the construction technique runs exponentially faster than the standard RE to DFA technique. Other construction techniques for constructing a DFA also fall within the broader aspects of this disclosure.

With continued reference to FIG. 2, the DFA is then translated at 24 into state transition tables. More specifically, each node of the deterministic finite automaton is translated to a state transition table in a manner readily known. The state transition tables are in turn combined at 25 into a single lookup table. Finally, the lookup table is instantiated at 26 into a ternary content-addressable memory and used for regular expression matching or other packet inspection processes as are readily found in the art. While reference is made throughout this disclosure to ternary content addressable memory (TCAM), concepts disclosed herein are extendable to other types of content addressable memory, random access memory or combinations thereof.

There are two key technical challenges in TCAM-based RE matching. The first is encoding a large DFA in a small TCAM. Directly encoding a DFA in a TCAM using one TCAM entry per transition will lead to a prohibitive amount of TCAM space. For example, consider a DFA with 25000 states that consumes one 8 bit character per transition. The TCAM would need a total of 140.38 Mb (=25000×$2^8$×(8+⌈log 25000⌉)). This is infeasible given the largest available TCAM chip has a capacity of only 72 Mb. To address this challenge, two techniques are used that minimize the TCAM space for storing a DFA: transition sharing and table consolidation. The second challenge is improving RE matching speed and thus throughput. One way to improve the throughput by up to a factor of k is to use k-stride DFAs that consume k input characters per transition. However, this leads to an exponential increase in both state and transition spaces. Variable striding is used to avoid this space explosion.

The basic idea of transition sharing is to combine multiple transitions into one TCAM entry by exploiting two properties of DFA transitions: (1) character redundancy where many transitions share the same source state and destination state and differ only in their character label, and (2) state redundancy where many transitions share the same character label and destination state and differ only in their source state. One reason for the pervasive character and state redundancy in DFAs constructed from real-world RE sets is that most states have most of their outgoing transitions going to some common "failure" state; such transitions are often called default transitions. The low entropy of these DFAs open optimization opportunities. Character redundancy is exploited by character bundling (i.e., input character sharing) and state redundancy by shadow encoding (i.e., source state sharing). In character bundling, a ternary encoding of the input character field is used to represent multiple characters and thus multiple transitions that share the same source and destination states. In shadow encoding, a ternary encoding for the source state ID is used to represent multiple source states and thus multiple transitions that share the same label and destination state.

Character bundling exploits character redundancy by combining multiple transitions from the same source state to the same destination into one TCAM entry. Character bundling consists of four steps: (1) assign each state a unique ID of ⌈log |Q|⌉ bits; (2) for each state, enumerate all 256 transition rules where for each rule, the predicate is a transition's label and the decision is the destination state ID; (3) for each state, treating the 256 rules as a 1-dimensional packet classifier and leveraging the ternary nature and first-match semantics of TCAMs, minimize the number of transitions using the optimal 1-dimensional TCAM minimization algorithm; and (4) concatenate the |Q| 1-dimensional minimal prefix classifiers together by prepending each rule with its source state ID. Further details regarding an exemplary 1-dimensional minimization algorithm may be found in U.S. patent Ser. No. 12/578,824 entitled "Systematic Approach Towards Minimizing Packet Classifiers" which is incorporated by reference herein. The resulting list can be viewed as a 2-dimensional classifier where the two fields are source state ID and transition label and the decision is the destination state ID. FIG. 1 shows an example DFA and its TCAM lookup table built using character bundling. The three chunks of TCAM entries encode the 256 transitions for $s_0$, $s_1$, and $s_2$, respectively. Without character bundling, we would need 256×3 entries.

Shadow encoding uses ternary codes in the source state ID field to encode multiple source states. With reference to FIG. 1, observe that all transitions with source states $s_1$ and $s_2$ only in the character range [a, o]. This implies there is a lot of state redundancy. The table below shows how we can exploit state redundancy to further reduce required TCAM space.

| TCAM | | SRAM |
|---|---|---|
| Src State ID | Input | Dest State ID |
| $s_1$ | 00 | 0110 0011 | 01: $s_2$ |
| $s_2$ | 0* | 0110 001* | 00: $s_1$ |
| | 0* | 0110 0000 | 10: $s_0$ |
| | 0* | 0110 **** | 01: $s_2$ |
| $s_0$ | ** | 0110 0000 | 10: $s_0$ |
| | ** | 0110 **** | 00: $s_1$ |
| | ** | **** **** | 10: $s_0$ |

First, since states $s_1$ and $s_2$ are more similar, give them the state IDs 00 and 01, respectively. State $s_2$ uses the ternary code of 0* in the state ID field of its TCAM entries to share transitions with state $s_1$. State $s_0$ is given the state ID of 10, and it uses the ternary code of ** in the state ID field of its TCAM entries to share transitions with both states $s_1$ and $s_2$. Second, order the state tables in the TCAM so that state $s_1$ is first, state $s_2$ is second, and state $s_0$ is last. This facilitates the share of transitions among different states where earlier states have incomplete tables deferring some transitions to later tables.

To implement shadow encoding, three problems must be solved: (1) find the best order of the state tables in the TCAM given that any order is allowed; (2) identify entries to remove from each state table given this order; and (3) choose binary IDs and ternary codes for each state that support the given order and removed entries. These problems are addressed below.

Shadow encoding technique builds upon work with default transitions by exploiting the same state redundancy observation and using their concepts of default transitions and delayed input DFAs ($D^2FA$). However, the final technical solutions are different because of the TCAM implementation whereas prior techniques work with RAM. For example, the concept of a ternary state code has no meaning when working with RAM. The key advantage of shadow encoding in TCAM over prior default transition techniques is speed. Specifically, shadow encoding incurs no delay while prior default transition techniques incur significant delay because a DFA may have to traverse multiple default transitions before consuming an input character.

First, how to compute the order of tables within the TCAM is described. Some concepts are used, such as default transitions and $D^2FA$, that were originally defined by Kumar et al "Algorithms to accelerate multiple regular expressions matching for deep packet inspection" In Proc. SIGCOMM, 2006 and subsequently refined by others. A $D^2FA$ is a DFA with default transitions where each state p can have at most one default transition to one other state q in the $D^2FA$. In a legal $D^2FA$, the directed graph consisting of only default transitions must be acrylic; we call this graph a deferment forest. It is a forest rather than a tree since more than one node may not have a default transition. A tree in a deferment forest is called a deferment tree.

Determine the order of state tables in TCAM by constructing a deferment forest and then using the partial order defined by the deferment forest. Specifically, if there is a directed path from state p to state q in the deferment forest, say that state p defers to state q, denoted p≻ q. If p≻ q, say that state p is in state q's shadow. Use the partial order of a deferment forest to determine the order of state transition tables in the TCAM. Specifically, state q's transition table must be placed after the transition tables of all states in state q's shadow.

A deferment forest that minimizes the TCAM representation of the resulting $D^2FA$ is computed as follows. The algorithm builds upon algorithms from prior works, but there are several key differences. First, unlike prior work, a speed penalty is not paid for long default transition paths. Thus, better transition sharing is achieved than prior work. Second, to maximize the potential gains from the variable striding technique described below and table consolidation, choose states that have lots of self-loops to be the roots of our deferment trees. Prior work has typically chosen roots in order to minimize the distance from a leaf node to a root. Third, explicitly ignore transition sharing between states that have few transitions in common. This has been done implicitly in the past, but show how doing so leads to better results when table consolidation is used.

Figure 3:
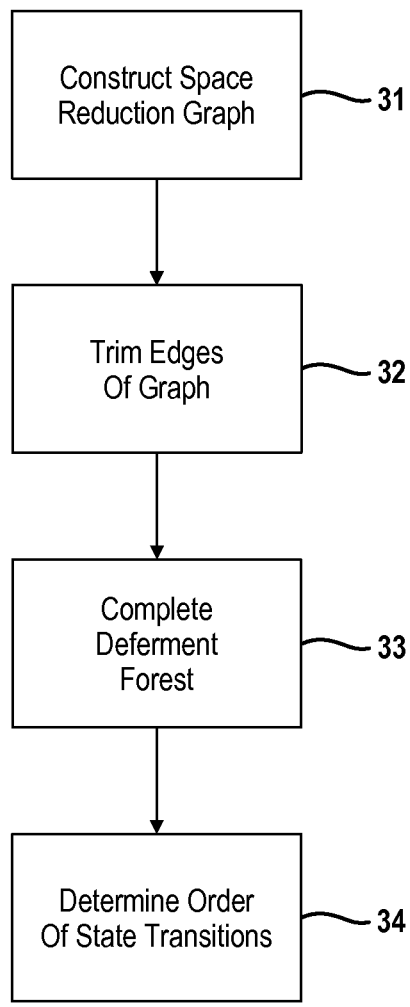
FIG. 3 is a flowchart illustrating an exemplary method for shadow encoding identifiers for source states in a state transition table

FIG. 3 illustrates an exemplary method for shadow encoding identifiers for source states in a state transition table. First, a space reduction graph is constructed at 31 from a given deterministic finite automaton. Given a DFA with |Q| states, an SRG is a clique with |Q| vertices each representing a distinct state. The weight of each edge is the number of common (outgoing) transitions between the two connected states.

Second, edges in the graph having a weight below a predefined threshold (e.g., 10) are trimmed away at 32. This step is justified based on the following observations. A key property of SRGs observed is that the weight distribution is bimodal: an edge weight is typically either very small (<10) or very large (>180). If we use these low weight edges for default transitions, the resulting TCAM often has more entries. Plus, we get fewer deferment trees which hinders our table consolidation technique.

Third, a deferment forest is computed at 33 by finding a maximum weight spanning forest for the trimmed graph. In an exemplary embodiment, the deferment forest is computed by running Kruskal's algorithm to find a maximum weight spanning forest.

Figure 4A:
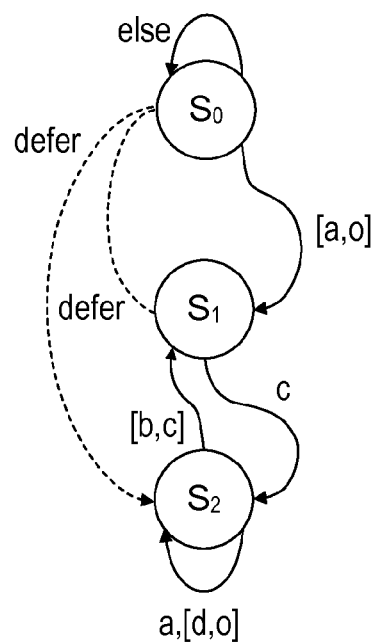
FIGS. 4A-4C are diagrams of an exemplary deterministic finite automata with default transitions along with a corresponding space reduction graph and deferment tree, respectively.
Figure 4B:
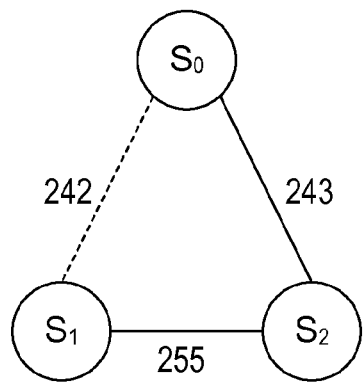
Figure 4C:
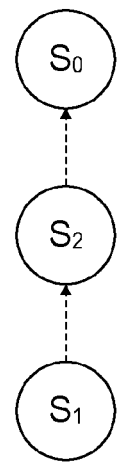

For each deferment tree, pick the state that has largest number of transitions going back to itself as the root. FIGS. 4B and 4C show the SRG and the deferment tree, respectively, for the DFA in FIG. 1. In most deferment trees, more than 128 (i.e., half) of the root state's outgoing transitions lead back to the root state; such a state is referred to as a self-looping state. Based on the pigeonhole principle and the observed bimodal distribution, each deferment tree can have at most one self-looping state, and it is clearly the root state. Choosing self-looping states as roots improve the effectiveness of variable striding as further described below. Intuitively, a very space efficient method results, self-loop unrolling, for increasing the stride of self-looping root states. The resulting increase in stride applies to all states that defer transitions to this self-looping root state. When Kruskal's algorithm is applied, a tie breaking strategy is needed because many edges have the same weight. To have most deferment trees centered around a self-looping state, priority is given to edges that have the self-looping state as one endpoint. If there is still a tie, edges are favored by the total number of edges in the current spanning tree that both endpoints are connected to prioritize nodes that are already well connected.

To ensure that proper sharing of transitions occurs, the source state IDs of the TCAM entries need to be encoded according to the following shadow encoding scheme. Each state is assigned a binary state ID and a ternary shadow code. State IDs are used in the decisions of transition rules. Shadow codes are used in the source state ID field of transition rules. In a valid assignment, every state ID and shadow code must have the same number of bits, which we call the shadow length of the assignment. For each state p, use ID(p) and SC(p) to denote the state ID and shadow code of p. A valid assignment of state IDs and shadow codes for a deferment forest must satisfy the following four shadow encoding properties:

1. Uniqueness Property: For any two distinct states p and q, $ID(p) \neq ID(q)$ and $SC(p) \neq SC(q)$.
2. Self-Matching Property: For any state p, $ID(p) \in SC(p)$ (i.e., ID(p) matches SC(p)).
3. Deferment Property: For any two states p and q, $p \succ q$ (i.e., q is an ancestor of p in the given deferment tree) if and only if $SC(p) \subset SC(q)$.
4. Non-interception Property: For any two distinct states p and q, $p \succ q$ if and only if $ID(p) \in SC(q)$.

Intuitively, q's shadow code must include the state ID of all states in q's shadow and cannot include the state ID of any states not in q's shadow.

Finally, an assignment of state Ids and shadow codes are made at 34. An exemplary algorithm for computing a valid assignment of state IDs and shadow codes for each state given a single deferment tree DT is provided below. Deferment forests are handled by simply creating a virtual root node whose children are the roots of the deferment trees in the forest and then running the algorithm on this tree. In the following explanation, states are referred to as nodes.

The algorithm uses the following internal variables for each node v: a local binary ID denoted L(v), a global binary ID denoted G(v), and an integer weight denoted W(v) that is the shadow length we would use for the subtree of DT rooted at v. Intuitively, the state ID of v will be G(v)|L(V) where | denotes concatenation, and the shadow code of v will be the prefix string G(v) followed by the required number of *'s; some extra padding characters may be needed. #L(v) and #G(v) are used to denote the number of bits in L(v) and G(v), respectively.

During operation, the algorithm processes nodes in a bottom-up fashion. For each node v, we initially set $L(v)=G(v)=\emptyset$ and W(v)=0. Each leaf node of DT is now processed which may be denoted by marking the nodes (e.g., red). An internal node v is processed when all its children $v_1 \ldots v_n$ are red. Once a node v is processed, its weight W(v) and its local ID L(v) are fixed, but additional bits are prepended to its global ID G(v) when its ancestors in DT are processed. v and each of its children are assigned a variable-length binary code, which is referred to HCode. The HCode provides a unique signature that uniquely distinguishes each of the n+1 nodes from each other while satisfying the four required shadow code properties. One option would be to simply use lg(n+1) bits and assign each node a binary number from 0 to n. However, to minimize the shadow code length W(v), a Huffman coding style algorithm is used instead to compute the HCodes and W(v). This algorithm uses two data structures: A binary encoding tree T with n+1 leaf nodes, one for v and each of its children, and a min-priority queue, initialized with n+1 elements, one for v and each of its children, that is ordered by node weight. While the priority queue has more than one element, remove the two elements x and y with lowest weight from the priority queue, create a new internal node z in T with two children x and y and set weight(z)=maximum(weight(x), weight(y))+1, and then put element z into the priority queue. When there is only a single element in the priority queue, the binary encoding tree T is complete. The HCode assigned to each leaf node v' is the path in T from the root node to v' where left edges have value 0 and right edges have value 1. Update the internal variables of v and its descendants in DT as follows. We set v to be its HCode, and W(v) to be the weight of the root node of T; G(v) is left empty. For each child $v_i$, we prepend $v_i$'s HCode to the global ID of every node in the subtree rooted at $v_i$ including $v_i$ itself. Then mark v as red. This continues until all nodes are red.

Each node is now assigned a state ID and a shadow code. First, set the shadow length to be k, the weight of the root node of DT. Use $\{*\}^m$ to denote a ternary string with m number of *'s and $\{0\}^m$ to denote a binary string with m number of 0's. For each node v, compute v's state ID and shadow code as follows: $ID(v)=G(v)|L(v)|\{0\}^{k-\#G(v)-\#L(v)}$, $SC(v)=G(v)|\{*\}^{k-\#G(v)}$.

Figure 5A:
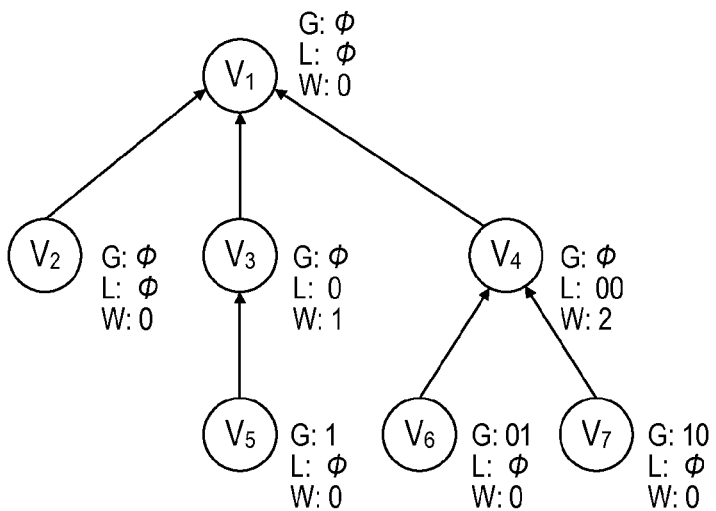
FIGS. 5A-5C are diagrams illustrating an example of shadow encoding.
Figure 5B:
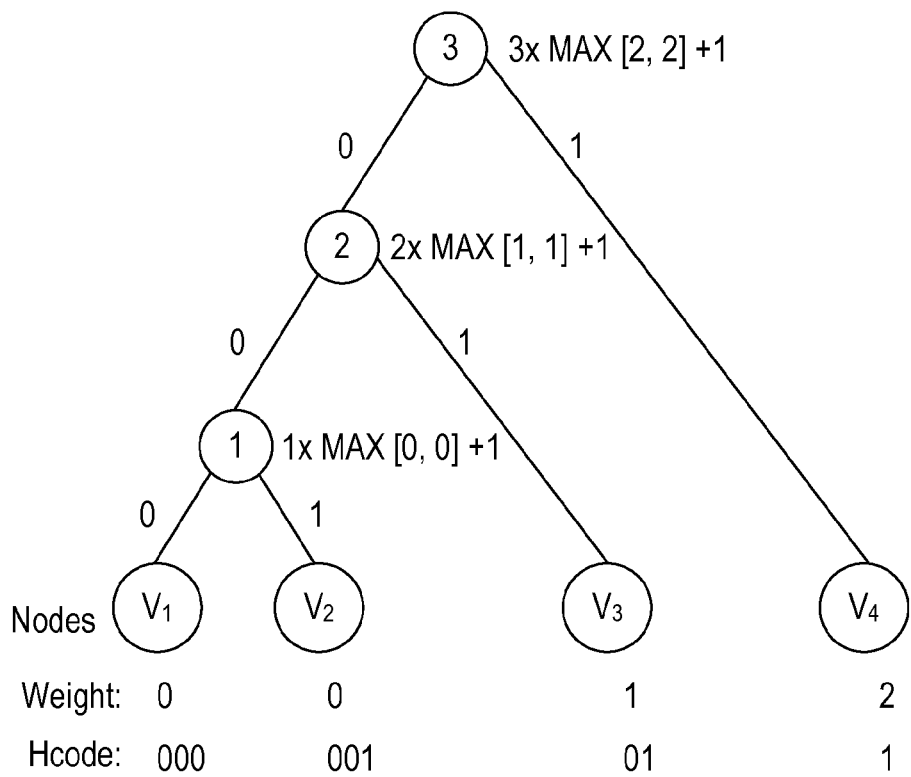
Figure 5C:
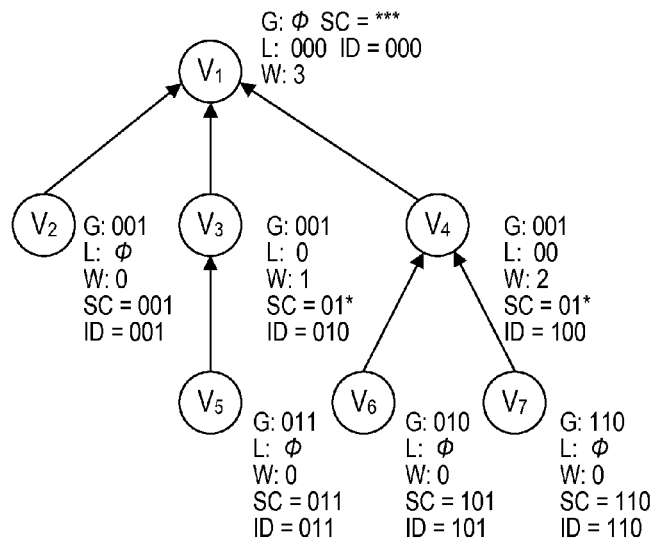

FIGS. 5A-5C further illustrate this shadow encoding algorithm. FIG. 5A shows all the internal variables just before $v_1$ is processed. FIG. 5B shows the Huffman style binary encoding tree T build for node $v_1$ and its children $v_2$, $v_3$ and $v_4$ and the resulting HCodes. FIG. 5C shows each node's final weight, global ID, local ID, state ID and shadow code. Pseudo-code for the shadow encoding algorithm is set forth below.

```
Input: Dptr Forest with n states, s₁ ..., sₙ.
Output: ID (1..n) and SC(1..n) for each state.
Step 1. Add a dummy state s₀ with all the tree roots as its children.
Step 2. Set all ID( )'s and SC( )'s to the empty string.
Step 3. Shadow_Encode (s₀).
Shadow_Encode(s)
r:=Number of children of s;
CHILD (1..r):=List of children of s;
for i=1..r do
    CL (i):=Shadow_Encode(CHILD (i));
m:=max(CL(1..r));
l:=⌈log₂ (r + 1) ⌉ + m
for i=1..r do
    L(i):=(i)₂ (0)^(m−CL(i));
    Attach L(i) in front of ID and SC for each state in the
    subtree of CHILD (i);
ID (s):=(0)ˡ;
SC (s):=(*)ˡ;
Return l;
```

The correctness of our shadow encoding algorithm is based on Theorem 4.2 below. Proving this theorem is simple. The uniqueness property is satisfied because the global IDs generated by our Hcode assignment algorithm are globally unique for a tree at the root level and the uniqueness is preserved by prepending them to the global IDs of all nodes in the subtrees. The self-matching property is obvious from the way that we compute state IDs and shadow codes. The deferment property is satisfied because the global IDs are generated by prepending Hcodes from all ancestors. The non-interception property is also satisfied. For any two distinct states p and q that $p \not\prec q$ and $q \not\prec p$, p and q must have a common ancestor r in the deferment tree such that $r \neq p$ and $r \neq q$. Thus, because of the Hcodes generated by our Hcode assignment algorithm are unique, the global IDs of p and q must be different.

Theorem 4.2: The state IDs and shadow codes generated by our shadow encoding algorithm satisfy the SEP. Also the shadow encoding algorithm produces an encoding of minimum length.

Theorem 4.3: Let p be the length of smallest possible encoding that satisfies the SEP, when the SCs are limited to prefix codes. Then the shadow encoding algorithm generates an encoding of length p.

Proof: The proof is by induction on the height of the deferment tree, n. Base case, n=0: For a single node the encoding is empty, which is trivially optimum.

Induction hypothesis: assume that shadow encoding generated for all trees with height<n has optimum length.

Induction step: given a tree with height n, let s be the root state, and $C=\{s_1, \ldots, s_c\}$ be the set of its c child states. Now, any valid encoding, of length x, that satisfies the SEP, and in which the shadow codes are prefix codes, must have the following structure:

$\forall s_i \in C, SC(s_i)=\{0,1\}^{x-y_i}\{*\}^{y_i}, 0 \leq y_i < x$. This is because the shadow codes are prefix codes. And $y_i \neq x$, otherwise the child shadow code will match all shadow IDs, including ID(s).

For each child state, $s_i$, the first $x-y_i$ bits of ID and SC of every state in the subtree rooted as $s_i$ must be the same. This is because $SC(s_i)$ must match the IDs and SCs of every state in that subtree.

For each child state, $s_i$, if the first $x-y_i$ bits is removed from the ID and SC of every state in the subtree rooted at $s_i$, the result is a valid shadow encoding of that subtree. This follows from the SEP and the above observation.

If the encoding has minimal length, then $SC(s)=\{*\}^x$. If there were leading binary bits, then by the previous two observations, the bits can be remove to get a smaller encoding.

Figure 6:
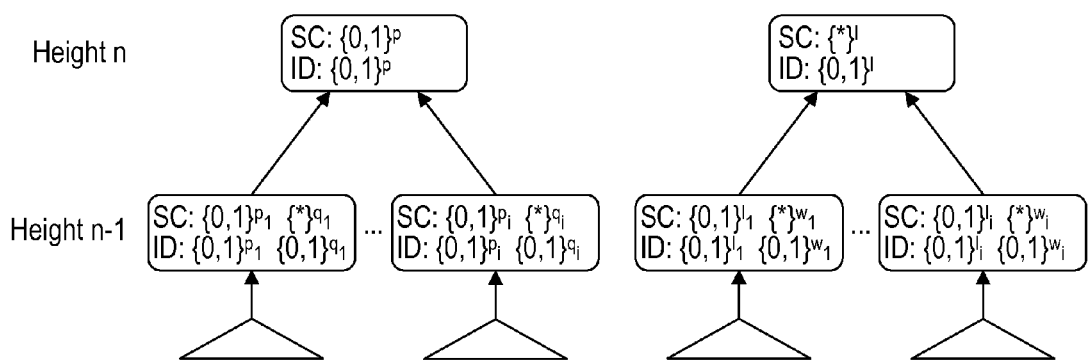
FIG. 6 is a diagram depicting an optimal shadow encoding.

FIG. 6 shows the situation. The optimum encoding has length p and the child shadow encodings have length $q_i$. The encoding produces by shadow encoding algorithm has length l and the child shadow encodings have length $w_i$. By the induction hypothesis, $\forall s_i \in C$, $w_i \leq q_i$. and $l=\max_i(l_i+w_i)$. The Huffman style encoding used by s minimizes the term $\max_i (l_i+w_i)$. Therefore, $l \leq p$. Experimentally, it was found that the shadow encoding algorithm is effective at minimizing shadow length. No DFA had a shadow length larger than $\lceil \log_2|Q| \rceil$ is the minimum possible shadow length.

For a given DFA and a corresponding deferment forest, a $D^2FA$ is constructed as follows. If state p has a default transition to state q, remove any transitions that are common to both p's transition table and q's transition table from p's transition table. Denote the default transition in the $D^2FA$ for the DFA in FIG. 1 given the corresponding deferment forest (a deferment tree in this case) in FIG. 3C. The TCAM entries for each transition table are now computed.

For each state, enumerate all individual transition rules except the deferred transitions. For each transition rule, the predicate is the label of the transition and the decision is the state ID of the destination state. For now, ensure each state has a unique state ID. Thus, we get an incomplete 1-dimensional classifier for each state. For each state, minimize its transition table using the 1-dimensional incomplete classifier minimization algorithm noted above. This algorithm works by first adding a default rule with a unique decision that has weight larger than the size of the domain, then applying the weighted one-dimensional TCAM minimization algorithm described in C. R. Meiners, et al "TCAM Razor: A systematic approach towards minimizing packet classifiers in TCAMs." In Proc. ICNP, 2007 to the resulting complete classifier, and finally remove the default rule, which is guaranteed to remain the default rule in the minimal complete classifier due to its huge weight. In this solution, the character bundling technique is used in this step. Some optimizations are considered where we specify some deferred transitions to reduce the total number of TCAM entries. For example, the second entry in $s_2$'s table is actually a deferred transition to state $s_0$'s table, but not using it would result in 4 TCAM entries to specify the transitions that $s_2$ does not share with $s_0$.

For a state p, with default transition to state q, after we remove transitions from p that are in common with q, we would want to compute the minimum (incomplete) classifier for the remaining transitions for p. One option is to use the 1-dimensional incomplete classifier minimization algorithm in C. Meiners, et al "Bit Weaving: A Non-Prefix Approach to Compressing Packet Classifiers in TCAMs". This will give us the smallest possible classifier if p had to defer all the transitions it has in common with q. But this is not true in our case. That is, p can specify a transition in its classifier (not defer it) even if that transition is common with q. Of course, we would only want to do this if it results in a smaller classifier.

For example, the second entry in $s_2$'s table is actually in common with state $s_2$ will have 4 TCAM entries. But by specifying it, we get a classifier with just 3 TCAM entries. For each transition in common between p and q, we have a choice whether to specify it in p's classifier or not. So we have the following problem, and we give an optimal algorithm for it.

Definition 4.1: (Partially Deferred Incomplete One-dimensional TCAM Minimization Problem). Given a one-dimensional packet classifier, f, on $\{*\}^b$, and a subset $D \subseteq \{*\}^b$, find the minimum cost prefix classifier, f', such that Cover(f') $\supseteq \{*\}^b \backslash D$ and is equivalent to f over Cover(f'). Here, b is the field width (in bits), and Cover(f) is the union of the predicates of all the rules in f (i.e. all the packets matched by f). For simplicity of description, we assume that the given classifier has flattened rule set (i.e. one rule for each packet, with the packet as the rule predicate).

Use $d_i$, $i \geq 1$ to denote the actual decisions in a classifier, and $d_0$ denotes the deferred decision. For a prefix $P = \{0,1\}^k \{*\}^{b-k}$, use $\underline{P}$ to denote the prefix $\{0,1\}^k 0 \{*\}^{b-k-1}$, and $\overline{P}$ to denote the prefix $\{0,1\}^k 1 \{*\}^{w-k-1}$.

For a classifier f on $\{*\}^b$ and a prefix $P \subseteq \{*\}^b$, $f_P$ denotes a classifier on P that is equivalent to f (i.e. the subset of rules in f with predicates that are in P). so $f = f_{\{*\}^b}$.

Rules with decision $d_0$ are used for convenience, so we always have complete classifiers. Rules with decision $d_0$ are removed at the end, and all packets with decision $d_i$, $i \geq 1$ have cost 1, and rules with decision $d_0$ have cost 0.

For $i \geq 1$, $f_P^{d_i}$ denotes a classifier on P that is equivalent to f and the decision of the last rule is $d_i$. It cannot have any rules with decision $d_0$.

$f_P^{d_0}$ denotes a classifier with $d_0$ as the decision of the last rule which is equivalent to f after all rules with decision $d_0$ have been removed. So, in $f_P^{d_0}$ we cannot have that a packet with decision $d_0$ is later matched by a rule with decision other than $d_0$ (otherwise, after removing the rules with decision $d_0$ that packet will not be deferred). To make sure of this, follow the convention that only the last rule in $f_P^{d_0}$ has decision $d_0$.

Intuitively, $f_P^{d_i}$ is a complete classifier on P, and $f_P^{d_0}$ is classifier on P with zero or more packets deferred (have decision $d_0$).

[P(x)] is equal to 1 when the statement inside is true, else it is equal to 0. And use x to represent some packet in the prefix P currently being considered. The algorithm is similar to the dynamic program given in C. R. Meiners, et al "TCAM RAZOR: A systematic Approach Towards minimizing packet classifiers in TCAMs" for the one-dimensional minimization. It recursively finds the minimum classifier for each prefix. Use $C(f_P^{d_i})$ to denote the cost of the minimum classifier equivalent to $f_P^{d_i}$. Then we have the following theorem.

Theorem 4.4: Given a one-dimensional classifier f on $\{*\}^b$, with set of possible decisions $\{d_1, d_2, \ldots, d_z\}$, and a prefix $P \subseteq \{*\}^b$, we have that $$C(f_P) = C(f_P^{d_0})$$

where $C(f_P^{d_i})$ is calculated as follows:

For $i > 0$ (1)
$$C(f_P^{d_i}) = \begin{cases} 1 + [f(x) \neq d_i \text{ if } f \text{ is consistent on } P] \\ \min_{j=1}^{z}(C)(f_{\underline{P}}^{d_j}) + C(f_{\overline{P}}^{d_j}) - 1 + [j \neq i]) \text{ else} \end{cases}$$

For $i = 0$ (2)
$$C(f_P^{d_0}) = \begin{cases} 0 \text{ if } P \subseteq D \\ 1 \text{ else if } f \text{ is consistent on } P \\ \min_{i=0}^{z}(C(f_{\underline{P}}^{d_i}) + C(f_{\overline{P}}^{d_i}) - [i \neq 0]) \text{ else} \end{cases}$$

Proof: The first equation follows from the definition of $f_P^{d_0}$.

(1) When $i > 0$, we are just building a minimum cost complete classifier. The recursion and the proof is exactly same as given in Theorem 4.1 (with decision weights=1).

(2) When $i = 0$. Here we have two base cases. First, if the entire prefix can be deferred, the minimum cost classifier is $\langle P \rightarrow d_0 \rangle$ with cost 0. Otherwise, if f is consistent on P, then the minimum cost classifier is $\langle P \rightarrow f(x), P \rightarrow d_0 \rangle$ with cost 1.

For the recursive case, the minimum cost classifier for P would just be the minimum cost classifier for $\underline{P}$ concatenated with the minimum cost classifier for $\overline{P}$, and both their last rules combined into a single rule $P \rightarrow d_0$. This will have cost $C(f_{\underline{P}}^{d_0}) + C(f_{\overline{P}}^{d_0})$. The only exception is when the minimum cost classifiers for both $\underline{P}$ and $\overline{P}$ are complete classifiers (in which case, they might have different last decisions, and just concatenating them will not work). For this case, the rest of the terms in the recursion (with $j > 0$) give the minimum cost complete classifier, and we just append that with the rule $P \rightarrow d_0$.

Table consolidation combine multiple transition tables for different states into a single transition table such that the combined table takes less TCAM space than the total TCAM space used by the original tables. To define table consolidation, we need two new concepts: k-decision rule and k-decision table. A k-decision rule is a rule whose decision is an array of k decisions. A k-decision table is a sequence of k-decision rules following the first-match semantics. Given a k-decision table T and i ($0 \leq i < k$), if for any rule r in T we delete all the decisions except the i-th decision, we get a 1-decision table, which we denote as T[i]. In table consolidation, we take a set of k 1-decision tables $T_0, \ldots, T_{k-1}$ and construct a k-decision table T such that for any i ($0 \leq i < k$), the condition $T_i \equiv T[i]$ holds where $T_i \equiv T[i]$ means that $T_i$ and T[i] are equivalent (i.e., they have the same decision for every search key). The process of computing k-decision table T is called table consolidation, and T is called the consolidated table.

Table consolidation is based on three observations. First, semantically different TCAM tables may share common entries with possibly different decisions. For example, the three tables for $s_0$, $s_1$ and $s_2$ in FIG. 1 have three entries in common: 01100000, 0110**, and ******. Table consolidation provides a novel way to remove such information redundancy. Second, given any set of k 1-decision tables $T_0, \ldots, T_{k-1}$, we can always find a k-decision table T such that for any i ($0 \leq i < k$), the condition $T_i \equiv T[i]$ holds. This is easy to prove as we can use one entry per each possible binary search key in T. Third, a TCAM chip typically has a built-in SRAM module that is commonly used to store lookup decision. For a TCAM with n entries, the SRAM module is arranged as an array of n entries where SRAM[i] stores the decision of TCAM[i] for every i. A TCAM lookup returns the index of the first matching entry in the TCAM, which is then used as the index to directly find the corresponding decision in the SRAM. In table consolidation, we essentially trade SRAM space for TCAM space because each SRAM entry needs to store multiple decisions. As SRAM is cheaper and more efficient than TCAM, moderately increasing SRAM usage to decrease TCAM usage is worthwhile.

The TCAM lookup table and the SRAM decision table for a 3-decision consolidated table for states $s_0$, $s_1$ and $s_2$ in FIG. 1 are as follows.

| TCAM | | SRAM | | |
| --- | --- | --- | --- | --- |
| Consolidated | Input | Column ID | | |
| Src Table ID | Character | 00 | 01 | 10 |
| 0 | 0110 0000 | $s_0$ | $s_0$ | $s_0$ |
| 0 | 0110 0010 | $s_1$ | $s_1$ | $s_1$ |
| 0 | 0110 0011 | $s_1$ | $s_2$ | $s_2$ |
| 0 | **** **** | $s_0$ | $s_0$ | $s_0$ |

In this example, by table consolidation, we reduce the number of TCAM entries from 11 to 5 for storing the transition tables for states $s_0$, $s_1$ and $s_2$. This consolidated table has an ID of 0. As both the table ID and column ID are needed to encode a state, we use the notation <Table ID>@<Column ID> to represent a state.

There are two key technical challenges in table consolidation. The first challenge is how to consolidate k 1-decision transition tables into a k-decision transition table. The second challenge is which 1-decision transition tables should be consolidated together. Intuitively, the more similar two 1-decision transition tables are, the more TCAM space saving we can get from consolidating them together. However, we have to consider the deferment relationship among states. Solutions to these two challenges are presented.

First, computing a k-decision table is explained. Assume we know which states need to be consolidated together and present a local state consolidation algorithm that takes a $k_1$-decision table for state set $S_i$ and a $k_2$-decision table for another state set $S_j$ as its input and outputs a consolidated $(k_1+k_2)$-decision table for state set $S_i \cup S_j$. For ease of presentation, first assume that $k_1=k_2=1$.

Let $s_1$ and $s_2$ be the two input states which have default transitions to states $s_3$ and $s_4$. We enforce a constraint that if we do not consolidate $s_3$ and $s_4$ together, then $s_1$ and $s_2$ may have incomplete transition tables due to default transitions to $s_3$ and $s_4$, respectively. We assign state $s_1$ column ID 0 and state $s_2$ column ID 1. This consolidated table will be assigned a common table ID X. Thus, we encode $s_1$ as X@0 and $s_2$ as X@1.

The key concepts underlying this algorithm are breakpoints and critical ranges. To define breakpoints, it is helpful to view $\Sigma$ as numbers ranging from 0 to $|\Sigma|-1$; given 8 bit characters, $|\Sigma|=256$. For any state s, we define a character $i \in \Sigma$ to be a breakpoint for s if $\delta(s, i) \neq \delta(s, i-1)$. For the end cases, we define 0 and $|\Sigma|$ to be breakpoints for every state s. Let b(s) be the set of breakpoints for state s. We then define $bs = \cup_{s \in S} b(s)$ to be the set of breakpoints for a set of states $S \subset Q$. Finally, for any set of states S, we define r(S) to be the set of ranges defined by b(S): $r(S)=\{[0,b_2-1], [b_2,b_3-1], \ldots, [b_{|b(S)|-1}, |\Sigma|-1]\}$ where $b_i$ is the smallest breakpoint and $|\Sigma|$ is the largest breakpoint in b(S). Within r(S), we label the range beginning at breakpoint $b_i$ as $r_i$ for $1 \leq i \leq |b(s)|-1$. If $\sigma(s,b_i)$ is deferred, then $r_i$ is a deferred range.

When we consolidate $s_1$ and $s_2$ together, we compute $b(\{s_1, s_2\})$ and $r(\{s_1,s_2\})$. For each $r' \in r(\{s_1,s_2\})$ where $r'$ is not a deferred range for both $s_1$ and $s_2$, we create a consolidated transition rule where the decision of the entry is the ordered pair of decisions for state $s_1$ and $s_2$ on $r'$. For each $r' \in r(\{s_1,s_2\})$ where $r'$ is a deferred range for one of $s_1$ but not the other, we fill in $r'$ in the incomplete transition table where it is deferred, and we create a consolidated entry where the decision of the entry is the ordered pair of decisions for state $s_1$ and $s_2$ on $r'$. Finally, for each $r' \in r(\{s_1,s_2\})$ where $r'$ is a deferred range for both $s_1$ and $s_2$, we do not create a consolidated entry. This produces a non-overlapping set of transition rules that may be incomplete if some ranges do not have a consolidated entry. If the final consolidated transition table is complete, we minimize it using the optimal 1-dimensional TCAM minimization algorithm. If the table is incomplete, we minimize it using the 1-dimensional incomplete classifier minimization algorithm. We generalize this algorithm to cases where $k_1>1$ and $k_2>1$ by simply considering $k_1+k_2$ states when computing breakpoints and ranges.

Next, a global consolidation algorithm is described for determining which states to consolidate together. As observed earlier, if we want to consolidate two states $s_1$ and $s_2$ together, we need to consolidate their parent nodes in the deferment forest as well or else lose all the benefits of shadow encoding. Thus, we propose to consolidate two deferment trees together.

A consolidated deferment tree must satisfy the following properties. First, each node is to be consolidated with at most one node in the second tree; some nodes may not be consolidated with any node in the second tree. Second, a level i node in one tree must be consolidated with a level i node in the second tree. The level of a node is its distance from the root. We define the root to be a level 0 node. Third, if two level i nodes are consolidated together, their level i–1 parent nodes must also be consolidated together. An example legal matching of nodes between two deferment trees is depicted in FIG. 6.

Given two deferment trees, we start the consolidation process from the roots. After we consolidate the two roots, we need to decide how to pair their children together. For each pair of nodes that are consolidated together, we again must choose how to pair their children together, and so on. We make an optimal choice using a combination of dynamic programming and matching techniques. The algorithm proceeds as follows. Suppose we wish to compute the minimum cost C(x, y), measured in TCAM entries, of consolidating two subtrees rooted at nodes x and y where x has u children $X=\{x_1, \ldots, x_u\}$ and y has v children $Y=\{y_1, \ldots, y_v\}$. We first recursively compute $C(x_i, y_j)$ for $1 \leq i \leq u$ and $1 \leq j \leq v$ using our local state consolidation algorithm as a subroutine. We then construct a complete bipartite graph $K_{X,Y}$ such that each edge $(x_i, y_j)$ for $1 \leq j \leq v$. Here C(x,y) is the cost of a minimum weight matching of K(X,Y) plus the cost of consolidating x and y. When $|X| \neq |Y|$, to make the sets equal in size, we paid the smaller set with null states that defer all transitions.

Finally, we must decide which trees to consolidate together. Assume that we produce k-decision tables where k is a power of 2. How to solve the problem for k=2 is described first. We create an edge-weighted complete graph where each deferment tree is a node and where the weight of each edge is the cost of consolidating the two corresponding deferment trees together. We find a minimum weight matching of this complete graph to give us an optimal pairing for k=2. For larger $k=2^l$, we then repeat this process l–1 times. Our matching is not necessarily optimal for k>2.

In some cases, the deferment forest may have only one tree. In such cases, we consider consolidating the sub-trees rooted at the children of the root of the single deferment tree. We also consider similar options if we have a few deferment trees but they are not structurally similar.

Pseudo-code for this algorithm is as follows.

```
Input: Dptr Forest with n states, s ,..., s_n.
Output: List of pairs...
Step 1. for each pair of roots, s_i and s_j, compute C(s_i,s_j);
Step 2. Construct complete graph K_r, with the roots as
       Vertices and C(s_i,s_j) as edge weights;
Step 3. Minimum_Weight_Matching (K_r) gives the matching
       Of the roots;
C (s_i,s_j)
Count := 0;
Attach NULL CHILDREN so that both s_i and s_j have same
       Number of children;
Construct complete graph K_{q,q}, with the children of s_i and
       s_j as the vertices, and C(s_x,s_y) as edge weight between
       states s_x and s_y;
Minimum_Bipartite_Weight_Matching (K_{q,q}) gives the
       matching of the children;
for each matching (s_x,s_y) do
       count := count + C(s_x,s_y);
count := count + Consolidated_Cost (s_i,s_j);
return count;
```

This algorithm using the matching subroutines gives the optimal answer, but can take long to run on larger DFAs.

A greedy variant is also proposed. When we need to match children of two nodes, x and y, consider one child at a time from the node with fewer children (say x). First all children of y are set unmarked. For each child, $x_i$, of x, we find the best match from the unmarked children of y, match them up, and set the matched child in y as marked. The best match for $x_i$ is given by $$\arg\min_{y_j \in \{\text{unmarked children of } y\}} \frac{C(x_i, y_j)}{C(x_i) + C(y_j)}$$

Here C(x) is just the cost (in TCAM entries) of the subtree rooted at x. If $C(x_i)+C(y_j)=0$ then we set the ratio to 0.5. All unmarked children of y at the end are matched with null states. The children of x are considered in decreasing order of $C(x_i)$. The idea being we would want to get the best picks for the larger children first.

The same approach is used for matching roots. First all roots are set unmarked. Each time we consider the largest unmarked root, find the best match for it, match the two roots and mark them. We have found that this greedy approach results in TCAM sizes almost the same as the optimal approach (<% worse), but runs much faster. Also with the greedy approach, using arg min $C(x_i, y_j)$ for the best match does not perform well and results in much larger TCAM sizes.

Figure 7:
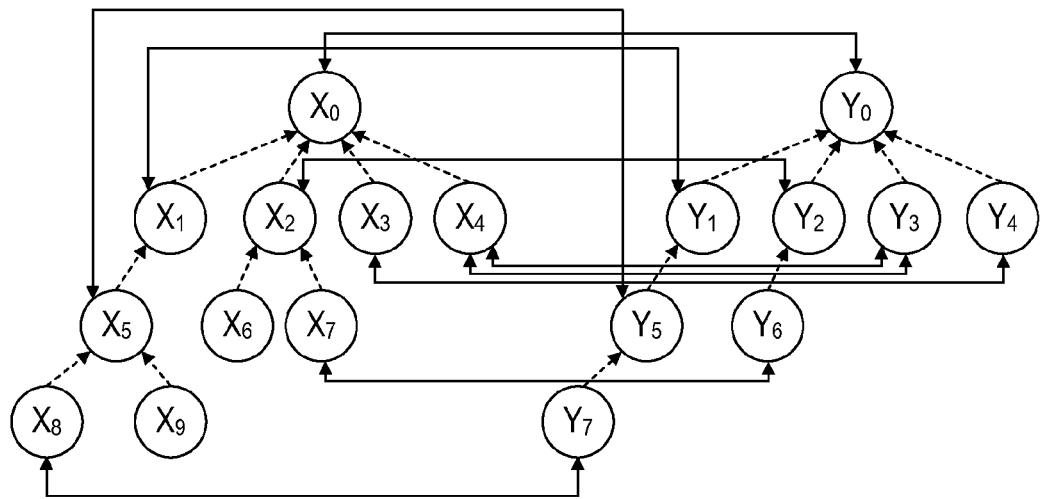
FIG. 7 is a diagram depicting exemplary matching of nodes between two deferment trees.
Figure 8:
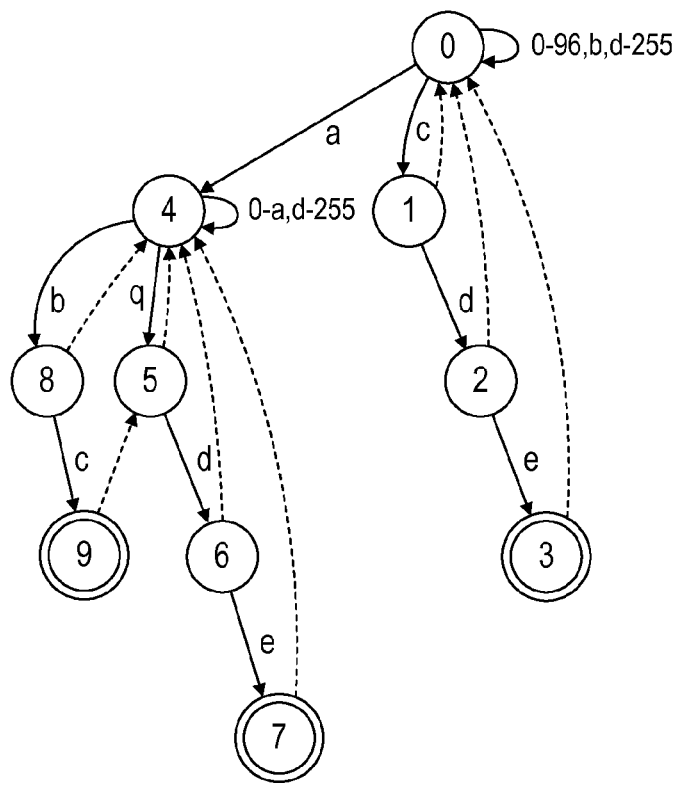
FIG. 8 is a diagram of an exemplary deterministic finite automata with default transitions for a given RE set.

Table consolidation works well on real-world RE sets. Most real-world RE sets contain REs with wildcard closures '.*' where the wildcard '.' Matches any character and the closure '*' allows for unlimited repetitions of the preceding character. Wildcard closures create deferment trees with lots of structural similarity. For example, consider the $D^2FA$ in FIG. 7 for RE set \{a.*bc,cde\} where we use dashed arrows to represent the default transitions. The wildcard closure '*' in the RE a.*bc duplicates the entire DFA sub-structure for recognizing string code. Thus, table consolidation of the subtree (0, 1, 2, 3) with the subtree (4,5,6,7) will lead to significant space saving.

Ways are explored to improve RE matching throughput by consuming multiple characters per TCAM lookup. One possibility is a k-stride DFA which uses k-stride transitions that consume k characters per transition. Although k-stride DFAs can speed up RE matching by up to a factor of k, the number of states and transitions can grow exponentially in k. To limit the state and transition space explosion, variable striding is proposed using variable-stride DFAs. A k-var-stride DFA consumes between 1 and k characters in each transition with at least one transition consuming k characters. Conceptually, each state in a k-var-stride DFA has $256^k$ transitions, and each transition is labeled with (1) a unique string of k characters and (2) a stride length $j (1 \le j \le k)$ indicating the number of characters consumed.

In TCAM-based variable striding, each TCAM lookup uses the next k consecutive characters as the lookup key, but the number of characters consumed in the lookup varies from 1 to k; thus, the lookup decision contains both the destination state ID and the stride length.

An example is used to show how variable striding can achieve a significant RE matching throughput increase with a small and controllable space increase. The following table shows a 3-var-stride transition table that corresponds to state $s_0$ in FIG. 1.

| | TCAM | SRAM |
|---|---|---|
| SRC | | DEC: Stride |
| $s_0$ | 0110 0000 **** **** **** **** | $s_0$: 1 |
| $s_0$ | 0110 **** **** **** **** **** | $s_1$: 1 |
| $s_0$ | **** **** 0110 0000 **** **** | $s_0$: 2 |
| $s_0$ | **** **** 0110 **** **** **** | $s_1$: 2 |
| $s_0$ | **** **** **** **** 0110 0000 | $s_0$: 3 |
| $s_0$ | **** **** **** **** 0110 **** | $s_1$: 3 |
| $s_0$ | **** **** **** **** **** **** | $s_0$: 3 |

This table only has 7 entries as opposed to 116 entries in a full 3-stride table for $s_0$. If we assume that each of the 256 characters is equally likely to occur, the average number of characters consumed per 3-var-stride transition of $s_0$ is 1*1/16+ 2*15/256+3*225/256=2.82.

How converting a 1-stride DFA to a k-stride DFA causes state explosion is first explained. For a source state and a destination state pair (s,d), a k-stride transition path from s to d may contain k−1 intermediate states (excluding d; for each unique combination of accepting states that appear on a k-stride transition path from s to d, we need to create a new destination state because a unique combination of accepting states implies that the input has matched a unique combination of REs. This can be a very large number of new states.

State explosion is eliminated by ending any k-var-stride transition path at the first accepting state it reaches. Thus, a k-var-stride DFA has the exact same state set as its corresponding 1-stride DFA. Ending k-var-stride transitions at accepting states does have subtle interactions with table consolidation and shadow encoding. We end any k-var-stride consolidated transition path at the first accepting state reached in any one of the paths being consolidated which can reduce the expected throughput increase of variable striding. There is a similar but even more subtle interaction with shadow encoding which we describe in the next section.

In a k-stride DFA converted from a 1-stride DFA with alphabet $\Sigma$, a state has $|\Sigma|^k$ outgoing k-stride transitions. Although we can leverage our techniques of character bundling and shadow encoding to minimize the number of required TCAM entries, the rate of growth tends to be exponential with respect to stride length k. Two key ideas are presented to control transition explosion: k-var-stride transition sharing and self-loop unrolling.

Root states are now considered, most of which are self-looping. We have two methods to compute the k-var-stride transition tables of root states. The first is direct expansion (stopping transitions at accepting states) since these states do not defer to other states which results in an exponential increase in table size with respect to k. The second method, which we call self-loop unrolling, scales linearly with k.

Self-loop unrolling increases the stride of all the self-loop transitions encoded by the last default TCAM entry. Self-loop unrolling starts with a root state j-var-stride transition table encoded as a compressed TCAM table of n entries with a final default entry representing most of the self-loops of the root state. Note that given any complete TCAM table where the last entry is not a default entry, we can always replace that last entry with a default entry without changing the semantics of the table. We generate the (j+1)-var-stride transition table by expanding the last default entry into n new entries, which are obtained by prepending 8*s as an extra default field to the beginning of the original n entries. This produces a (j+1)-var-stride transition table with 2n−1 entries. The table above shows the resulting table when we apply self-loop unrolling twice on the DFA in FIG. 1.

Figure 9:
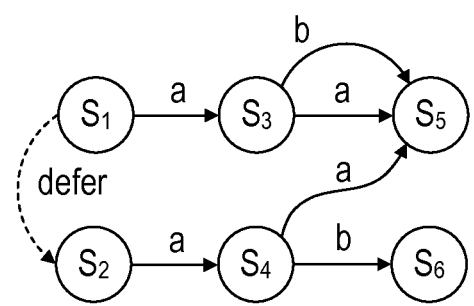
FIG. 9 is a diagram of a 1-stride DFA fragment.

Similar to 1-stride DFAs, there are many transition sharing opportunities in a k-var-stride DFA. Consider two states $s_0$ and $s_1$ in a 1-stride DFA where $s_0$ defers to $s_1$. The deferment relationship implies that $s_0$ shares many common 1-stride transitions with $s_1$. In the k-var-stride DFA constructed from the 1-stride DFA, all k-var-stride transitions that begin with these common 1-stride transitions are also shared between $s_0$ and $s_1$. Furthermore, two transitions that do not begin with these common 1-stride transitions may still be shared between $s_0$ and $s_1$. For example, in the 1-stride DFA fragment in FIG. 9, although $s_1$ and $s_2$ do not share a common transition for character a, when we construct the 2-var-stride DFA, $s_1$ and $s_2$ share the same 2-stride transition on string aa that ends at state $s_5$.

To promote transition sharing among states in a k-var-stride DFA, we first need to decide on the deferment relationship among states. The ideal deferment relationship should be calculated based on the SRG of the final k-var-stride DFA. However, the k-var-stride DFA cannot be finalized before we need to compute the deferment relationship among states because the final k-var-stride DFA is subject to many factors such as available TCAM space. There are two approximation options for the final k-var-stride DFA for calculating the deferment relationship: The 1-stride DFA and the full k-stride DFA. We have tried both options in our experiments, and the difference in the resulting TCAM space is negligible. Thus, we simply use the deferment forest of the 1-stride DFA in computing the transition tables for the k-var-stride DFA.

Second, for any two states $s_1$ and $s_2$ where $s_1$ defers to $s_2$, we need to compute $s_1$'s k-var-stride transition table. Although this computation is trivial for 1-stride DFAs, this is a significant challenge for k-var-stride DFAs because each state has too many ($256^k$) k-var-stride transitions. The straightforward algorithm that enumerates all transitions has a time complexity of $O(|Q|^2|\Sigma|^k)$, which grows exponentially with k. We propose a dynamic programming algorithm with a time complexity of $O(|Q|^2|\Sigma|k)$, which grows linearly with $s_2$. Our key idea is that the non-shared transitions for a k-stride DFA can be quickly computed from the non-shared transitions of a (k−1)-var-stride DFA. For example, consider the two states $s_1$ and $s_2$ in FIG. 9 where $s_1$ defers to $s_2$. For character a, $s_1$ transits to $s_3$ while $s_2$ transits to $s_4$. Assuming that we have computed all (k−1)-var-stride transitions of $s_3$ that are not shared with the (k−1)-var-stride transitions of $s_4$, if we prepend all these (k−1)-var-stride transitions with character a, the resulting k-var-stride transitions of $s_1$ are all not shared with the k-var-stride transitions of $s_2$, and therefore should all be included in $s_1$'s k-var-stride transition table. Formally, using $n(s_i, s_j, k)$ to denote the number of k-stride transitions of $s_1$ that are not shared with $s_j$ our dynamic programming algorithm uses the following recursive relationship between $n(s_i, s_j, k)$ and $n(s_i, s_j, k-1)$ $$n(s_i, s_j, 0) = \begin{cases} 0 & \text{if } s_i = s_j \\ 1 & \text{if } s_i \neq s_j \end{cases} \quad (1)$$

$$n(s_i, s_j, k) = \sum_{c \in \Sigma} n(\delta(s_i, c), \delta(s_j, c), k-1) \quad (2)$$

The above formulae assume that the intermediate states on the k-stride paths starting from $s_i$ or $s_j$ are all non-accepting. For state we stop increasing the stride length along a path whenever we encounter an accepting state on that path or on the corresponding path starting from $s_j$. The reason is similar to why we stop a consolidated path at an accepting state, but the reasoning is more subtle.

Let p be the string that leads $s_j$ to an accepting state. The key observation is that we know that any k-var-stride path that starts from $s_j$ and begins with p ends at that accepting state. This means that $s_i$ cannot exploit transition sharing on any strings that begin with p.

The above dynamic programming algorithm produces non-overlapping and incomplete transition tables that we compress using the 1-dimensional incomplete classifier minimization algorithm noted above.

Propose solutions are presented for the third key challenge—which states should have their stride lengths increased and by how much, i.e., how should we compute the transition function σ. Note that each state can independently choose its variable striding length as long as the final transition tables are composed together according to the deferment forest. This can be easily proven based on the way that we generate k-var-stride transition tables. For any two states $s_1$ and $s_2$ where $s_1$ defers to $s_2$, the way that we generate $s_1$'s k-var-stride transition table is seemingly based on the assumption that $s_2$'s transition table is also k-var-stride; actually, we do not have this assumption. For example, if we choose k-var-stride (2≤k) for $s_1$ and 1-stride for $s_2$, all strings from $s_1$ will be processed correctly; the only issue is that strings deferred to $s_2$ will process only one character.

This is viewed as a packing problem: given a TCAM capacity C, for each state s, select a variable stride length value $K_s$, such that $\Sigma_{s \in Q}|T(s,K_s)| \leq C$, here $T(s,K_s)$ denotes the $K_s$-var-stride transition table of state s. This packing problem has a flavor of the knap-sack problem, but an exact formulation of an optimization function is impossible without making assumptions about the input character distribution. We propose the following algorithm for finding a feasible δ that strives to maximize the minimum stride of any state. First, we use all the 1-stride tables as our initial selection. Second, for each j-var-stride (j≥2) table t of state s, we create a tuple (l,d,|t|) where l denotes variable stride length, d denotes the distance from state s to the root of the deferment tree that s belongs to, and |t| denotes the number of entries in t. As stride length l increases, the individual table size |t| may increase significantly, particularly for the complete tables of root states. To balance table sizes, we set limits on the maximum allowed table size for root states and non-root states. If a root state table exceeds the root state threshold when we create its j-var-stride table, we apply self-loop unrolling once to its (j−1)-var-stride table to produce a j-var-stride table. If a non-root state table exceeds the non-root state threshold when we create its j-var-stride table, we simply use its j−1-var-stridetable as its j-var-stride table. Third, we sort the tables by these tuple values in increasing order first using l, then using d, then using |t|, and finally a pseudorandom coin flip to break ties. Fourth, we consider each table t in order. Let t' be the table for the same state s in the current selection. If replacing t' by t does not exceed our TCAM capacity C, we do the replacement.

Some implementation issues associated with this TCAM based Re matching solution are described. First, the only hardware required to deploy our solution is the off-the-shelf TCAM (and its associated SRAM). Many deployed networking devices already have TCAMs, but these TCAMs are likely being used for other purposes. Thus, to deploy our solution on existing network devices, we would need to share an existing TCAM with another application. Alternatively, new networking devices can be designed with an additional dedicated TCAM chip.

Second, we describe how we update the TCAM when an RE set changes. First, we must compute a new DFA and its corresponding TCAM representation. For the moment, we recomputed the TCAM representation from scratch, but we believe a better solution can be found and is something we plan to work on in the future. We report some timing results in our experimental section. Fortunately, this is an offline process during which time the DFA for the original RE set can still be used. The second step is loading the new TCAM entries into TCAM. If we have a second TCAM to support updates, this rewrite can occur while the first TCAM chip is still processing packet flows. If not, RE matching must halt while the new entries are loaded. This step can be performed very quickly, so the delay will be very short. In contrast, updating FPGA circuitry takes significantly longer.

The various algorithms described herein may be implemented by one or more sets of computer executable instructions residing on a non-transitory computer memory and executed by a computer processor.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

What is claimed is:

1. A computer-implemented method for implementing regular expression matching using ternary content-addressable memory devices, comprising:

receiving a set of regular expressions that specify characters to be extracted from data packets;
constructing a deterministic finite automaton from the set of regular expressions;
building a state transition table for each node of the deterministic finite automaton, the table having an input field having a fixed number of bits for encoding characters to be extracted from data packets, by
 constructing a space reduction graph from the deterministic finite automaton, where vertices of the graph represent a distinct state of the automaton and weight assigned to each edge of the graph is a number of common transitions between two connected states;
 trimming away edges in the graph having a weight below a predefined threshold;
 computing a deferment forest by finding a maximum weight spanning forest for the space reduction graph; and
 assigning identifiers of source states and destination states for states of the deferment forest;
combining the state transition tables into a single lookup table;
instantiating the lookup table in a ternary content-addressable memory device, wherein assigning identifiers further comprises
constructing an assignment tree by adding a virtual root node whose children are root nodes of all deferment trees comprising the deferment forest;
assigning nonzero binary identifiers to each node in the assignment tree such that all siblings have the same identifier;
setting source state identifiers for each node in the assignment tree such that a source state identifier of a given node is set to a concatenation of the binary identifiers assigned to the given node and its parent nodes;
identifying longest source state identifier from amongst the nodes in the assignment tree and padding remaining source state identifiers with trailing wildcard bits; and
setting destination state identifiers for each node in the assignment tree such that a destination state identifier of a given node is set to corresponding source state identifier for the given node with trailing wildcard bits replaced by zeros.

2. The method of claim 1 wherein building a state transition table for each node further comprises combining transitions having the same source state and the same destination into one table entry.

3. The method of claim 2 further comprises:
assigning each state of the deterministic finite automaton a unique identifier;
enumerating all transition rules for each state;
minimizing number of transition rules using a partial prefix list minimization algorithm; and
concatenating the transition rules from each state together by prepending each transition rule with an identifier for its corresponding source state.

4. The method of claim 1 further comprises combining transitions by ternary encoding the identifiers for source states to represent multiple source states.

5. The method of claim 1 wherein assigning nonzero binary identifiers further comprises traversing nodes in the assignment tree in a bottom-up manner and computing binary identifiers using a Huffman type coding algorithm.

6. The method of claim 1 wherein combining the state transition tables further comprises defining a consolidated table having an array of decisions associated with each rule therein and consolidating states in the lookup table into the consolidated table.

7. The method of claim 1 wherein instantiating the lookup table further comprises encoding an identifier for a source state in a first column of the lookup table and input characters in a second column of the lookup table, and storing corresponding identifier for a destination state in an associated entry of a static random-access memory.

8. The method of claim 1 further comprises modifying the lookup table so that the input field is enlarged to accommodate multiple sub-fields, where each sub-field having the fixed number of bits, and the decision includes an identifier for a decision state and a stride length indicating a number of characters consumed in a table lookup.

9. The method of claim 8 wherein modifying the lookup table further comprises
   identifying at least one source state in the lookup table having a high degree of self-looping;
   determining, for each identified source state, the number of characters to be consumed for the identified source state;
   identifying, for each identified source state, entries for the identified state that transition to a different destination state;
   creating multiple entries for each identified entry of an identified source state, where the number of entries is equal to the number of characters to be consumed for the identified source state and bits from the input field of the identified entry are placed into a different sub-field of the enlarged input field amongst the multiple entries for the identified entry.

10. The method of claim 1 wherein instantiating the lookup table further comprises encoding an identifier for a source state in a first column of the lookup table and input characters in a second column of the lookup table, and storing corresponding destination identifier in an associated static random-access memory.

11. A method for encoding identifiers for source states in a state transition table, comprising:
   constructing a space reduction graph from the deterministic finite automaton, where vertices of the graph represent a distinct state of the automaton and weight assigned to each edge of the graph is a number of common transitions between two connected states;
   trimming away edges in the graph having a weight below a predefined threshold;
   computing a deferment forest by finding a maximum weight spanning forest for the space reduction graph;
   assigning identifiers for source states and destination states for states of the deferment forest by
      constructing an assignment tree by adding a virtual root node whose children are root nodes of all deferment trees comprising the deferment forest;
      assigning nonzero binary identifiers to each node in the assignment tree such that all siblings have the same identifier;
      setting source state identifiers for each node in the assignment tree such that a source state identifier of a given node is set to a concatenation of the binary identifiers assigned to the given node and its parent nodes;
      sizing source state identifiers for each node in the assignment tree to equate in size to longest source state identifier from amongst the nodes; and
      setting destination state identifiers for each node in the assignment tree such that a destination state identifier of a given node is set to corresponding source state identifier for the given node.

12. The method of claim 11 further comprises receiving a set of regular expressions that specify data elements to be extracted from data packets; and
   constructing the deterministic finite automaton from the set of regular expressions.

13. The method of claim 11 wherein sizing source state identifiers further comprises
   identifying longest source state identifier from amongst the nodes in the assignment tree and padding remaining source state identifiers with trailing wildcard bits.

14. The method of claim 13 wherein assigning nonzero binary identifiers further comprises traversing nodes in the assignment tree in a bottom-up manner and computing binary identifiers using a Huffman type coding algorithm.

15. A computer-implemented method for implementing regular expression matching using ternary content-addressable memory devices, comprising:
   receiving a set of regular expressions that specify characters to be extracted from data packets;
   constructing a deterministic finite automaton from the set of regular expressions;
   building a state transition table for each node of the deterministic finite automaton, the table having an input field having a fixed number of bits for encoding characters to be extracted from data packets;
   combining transitions in the state transition tables by ternary encoding characters of source states having the same characters in the input field and the destination state by
      constructing a space reduction graph from the deterministic finite automaton, where vertices of the graph represent a distinct state of the automaton and weight assigned to each edge of the graph is a number of common transitions between two connected states;
      trimming away edges in the graph having a weight below a predefined threshold;
      computing a deferment forest by finding a maximum weight spanning forest for the space reduction graph; and
      assigning identifiers of source states and destination states for states of the deferment forest;
   combining the state transition tables into a single lookup table; and
   instantiating the lookup table in a ternary content-addressable memory device, wherein assigning identifiers further comprises
      constructing an assignment tree by adding a virtual root node whose children are root nodes of all deferment trees comprising the deferment forest;
      assigning nonzero binary identifiers to each node in the assignment tree such that all siblings have the same identifier;
      setting source state identifiers for each node in the assignment tree such that a source state identifier of a given node is set to a concatenation of the binary identifiers assigned to the given node and its parent nodes;
      identifying longest source state identifier from amongst the nodes in the assignment tree and padding remaining source state identifiers with trailing wildcard bits; and setting destination state identifiers for each node in the assignment tree such that a destination state identifier of a given node is set to corresponding source state identifier for the given node with trailing wildcard bits replaced by zeros.

* * * * *

UNITED STATES PATENT AND TRADEMARK OFFICE
CERTIFICATE OF CORRECTION

PATENT NO. : 8,666,931 B2  
APPLICATION NO. : 13/183964  
DATED : March 4, 2014  
INVENTOR(S) : Liu et al.

Page 1 of 1

It is certified that error appears in the above-identified patent and that said Letters Patent is hereby corrected as shown below:

In the Specification:

Column 4, line 2      Before "$A_2$" insert --$q_{02}$,--.

Column 4, line 17     Delete "Hoperoft" and insert --Hopcroft--.

Column 4, line 18     Delete "computations" and insert --Computations--.

Column 4, line 34     Delete "$A_3(\delta_3([q_1, q_2], x)$" and insert --$A_3(\delta_3([q_1, q_2], x))$--.

Column 11, line 30    Delete "$f = f_{\{*\}}^b$." and insert --$f = f_{\{*\}}^b$.--.

Column 11, line 58    Delete "d2" and insert --$d_2$--.

Column 15, line 6     Delete "$s ,..., s_n$." and insert --$s_1,..., s_n$.--.

Column 15, line 18    Delete "$(K_{(q,q)})$" and insert --$(K_{q,q})$--.

Column 15, line 59    Delete "\{a.*bc,cde\}" and insert --\{a.*bc,cde\}--.

Column 16, line 43    Delete "(excluding d;" and insert --(excluding d);--.

Column 17, line 59    Delete "$0(|Q|^2|\Sigma|k)$," and insert --$0(|Q|^2|\Sigma|^k)$,--.

Column 18, line 11    Delete "$n(s_i, s_j 0)$" and insert --$n(s_i, s_j, 0)$--.

Column 18, line 19    After "state" insert --$s_i$,--.

Column 19, line 12    Delete "Re" and insert --RE--.

Signed and Sealed this  
Twelfth Day of August, 2014

Michelle K. Lee  
*Deputy Director of the United States Patent and Trademark Office*